(12) United States Patent
Lu et al.

(10) Patent No.: US 11,367,891 B2
(45) Date of Patent: Jun. 21, 2022

(54) INTEGRATED EQUIPMENT OF DIE-CUTTING AND STACKING

(71) Applicant: Shenzhen Greensun Technology Co., Ltd., Shenzhen (CN)

(72) Inventors: Shuli Lu, Shenzhen (CN); Jin Zhang, Shenzhen (CN); Yangqing Luo, Shenzhen (CN); Qingyi Wang, Shenzhen (CN)

(73) Assignee: Shenzhen Greensun Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/584,842

(22) Filed: Jan. 26, 2022

(65) Prior Publication Data

US 2022/0149419 A1 May 12, 2022

Related U.S. Application Data

(63) Continuation of application No. PCT/CN2019/109124, filed on Sep. 29, 2019.

(30) Foreign Application Priority Data

Aug. 6, 2019 (CN) .......................... 201910722276.3

(51) Int. Cl.
  *H01M 10/04* (2006.01)
  *H01M 4/04* (2006.01)
(52) U.S. Cl.
  CPC ....... *H01M 10/0404* (2013.01); *H01M 4/043* (2013.01); *H01M 4/0409* (2013.01); *H01M 10/0468* (2013.01)
(58) Field of Classification Search
  None
  See application file for complete search history.

(56) References Cited

U.S. PATENT DOCUMENTS 9,401,576 B2   7/2016  Miyazaki et al.

FOREIGN PATENT DOCUMENTS

CN   206564301 U    10/2017
CN   206678087 U  * 11/2017
(Continued)

OTHER PUBLICATIONS

CN206678087U translation (Year: 2017).*
(Continued)

*Primary Examiner* — Ula C Ruddock
*Assistant Examiner* — Amanda Rosenbaum

(57) ABSTRACT

An integrated equipment of die-cutting and stacking, including two electrode die-cutting mechanisms, two electrode conveying mechanisms, a positive electrode feeding mechanism, a negative electrode feeding mechanism, a battery separator unwinding mechanism, and a double stacking table mechanism. The positive electrode feeding mechanism and the negative electrode feeding mechanism are respectively arranged on two sides of the double stacking table mechanism; and one electrode conveying mechanism is arranged between the electrode die-cutting mechanism and the positive electrode feeding mechanism, and another electrode conveying mechanism is arranged between the electrode die-cutting mechanism and the negative electrode feeding mechanism; the battery separator unwinding mechanism is located above the double stacking table mechanism; the double stacking table mechanism includes a rotating shaft, two rotating arms, two central rotating shafts, a first stacking table and a second stacking table.

10 Claims, 9 Drawing Sheets

(56) References Cited

FOREIGN PATENT DOCUMENTS

| CN | 206678087 U | 11/2017 | | |
|---|---|---|---|---|
| CN | 107482171 A | 12/2017 | | |
| CN | 107508002 A | 12/2017 | | |
| CN | 206915302 U | 1/2018 | | |
| CN | 107508002 B | * 11/2019 | ........ | H01M 10/0525 |

OTHER PUBLICATIONS

CN107508002B translation (Year: 2019).*
Internation Search Report of PCT/CN2019/109124, dated Apr. 24, 2020.

* cited by examiner

INTEGRATED EQUIPMENT OF DIE-CUTTING AND STACKING

CROSS-REFERENCE TO RELATED APPLICATIONS

This application is a continuation of International Patent Application No. PCT/CN2019/109124 with a filing date of Sep. 29, 2019, designating the United States, now pending, and further claims priority to Chinese Patent Application No. 201910722276.3 with a filing date of Aug. 6, 2019. The content of the aforementioned applications, including any intervening amendments thereto, are incorporated herein by reference.

TECHNICAL FIELD

The present disclosure relates to the technical field of battery production equipment, and in particular, relates to an integrated equipment of die-cutting and stacking.

BACKGROUND

Lithium-ion battery is a new generation of green high-energy battery with excellent performance, which has become one of the focuses of high-tech development. Lithium-ion batteries have the following characteristics: high voltage, high capacity, low consumption, no memory effect, no pollution, small size, small internal resistance, less self-discharge, and more cycles. Because of the above characteristics, lithium-ion batteries have been applied to many civil and military fields such as mobile phones, notebook computers, video cameras, and digital cameras.

The cells of lithium-ion batteries are generally stacked, that is, they are stacked with positive electrodes, separators, and negative electrodes. When stacking, a Z-type integrated cell stacking machine is usually used. The positive electrode and the negative electrode are first transferred from the material box to the positive electrode stacking station and the negative electrode stacking station; then the battery separator is pulled under the positive electrode, the positive electrode is pressed on one side of the battery separator; and then the battery separator is pulled under the negative electrode, the negative electrode is pressed on the other side of the battery separator. The stacking is repeated until the positive and negative electrodes of preset number of layers are respectively stacked on both sides of the battery separator. After the stacking is completed, the electrodes are clamped by the winding manipulator and constantly rotated so that the battery separator is wound outside the electrodes.

However, the existing equipment generally has the defect of single function, can only realize one processing function, which has disadvantages of low automation, large space occupation, high production cost and high labor consumption. In addition, in the existing stacking equipment, the stacking table needs to wait for the unloading mechanism to complete the actions of cutting, clamping, and withdrawing the battery separator before it can continue stacking. Therefore, after the first cell is formed, and before stacking of the second cell, the stacking table is in an idle state, which wastes working time. Hence, the existing equipment has a low stacking efficiency and a limited production speed of the cells.

SUMMARY

In order to overcome the deficiencies of the prior art. the present disclosure provides an integrated equipment of die-cutting and stacking, which can realize die-cutting and stacking of electrodes, and solve the problems of low automation and low production efficiency of the equipment in the prior art, and realize continuous stacking operation and improve stacking efficiency.

The present disclosure provides an integrated equipment of die-cutting and stacking, comprising two electrode die-cutting mechanisms, two electrode conveying mechanisms, a positive electrode feeding mechanism, a negative electrode feeding, mechanism, a battery separator unwinding mechanism, and a double stacking table mechanism; wherein the positive electrode feeding, mechanism and the negative electrode feeding, mechanism are respectively arranged on two sides of the double stacking table mechanism; and one electrode conveying mechanism is, arranged between the electrode die-cutting mechanism and the positive electrode feeding mechanism, and another electrode conveying mechanism is arranged between the electrode die-cutting mechanism and the negative electrode feeding mechanism;

the battery separator unwinding mechanism is located above the double stacking table mechanism;

the double stacking table mechanism comprises a rotating shaft, two rotating arms, two central rotating shafts, a first stacking table and a second stacking table; two ends of the rotating shaft are respectively fixedly connected to middles of the two rotating arms; the first stacking table and the second stacking table are both arranged between the two rotating arms, and are located on two sides of the rotating shaft respectively; one central rotating shaft passes through the first stacking table, two ends of the one central rotating shaft are respectively rotatably connected with an end of one rotating arm and an end of an other rotating arm; an other central rotating shaft passes through the second stacking table, two ends of the other central rotating shaft are respectively rotatably connected with an other end of the one rotating arm and an other end of the other rotating arm; the first stacking table and the second stacking table are both configured to realize stacking of electrodes.

In the above structure, the first stacking table and the second stacking table have same structure; wherein, the first stacking table comprises a stacking base and a sheet-pressing assembly; the central rotating shaft passes through a center of the stacking base; each of opposite side walls of the stacking base is provided with a sheet-pressing assembly; the sheet-pressing assembly includes a sheet-pressing driving device, a rotary shaft, two rotary cams, two translation sliders and a sheet-pressing plate;

the two rotary cams are fixedly installed on the rotary shaft; each rotary cam is provided with an inclined guide ring, and the guide rings on the two rotary cams are symmetrical about a radial center line of the rotary shaft; each of the opposite side walls of the stacking base is slidably provided with the translation slider; each translation slider is fixedly provided with a limit stop; and the guide ring of the rotary cam is snapped into a limit groove of the limit stop;

the sheet-pressing plate is in a shape of "7", one end of the sheet-pressing plate is fixedly installed on the translation slider, and an other end of the sheet-pressing plate extends above the stacking base; the sheet-pressing driving device is arranged on a side wall of the stacking base and is configured to drive the rotary shaft to rotate.

In the above structure, the first stacking table further comprises a lifting assembly, and the lifting assembly comprises two first lifting sliding plates and a lifting driving device; the two first lifting sliding plates are respectively arranged on the opposite side walls of the stacking base; the lifting driving device is configured to drive the two first lifting sliding plates to slide up and down on the opposite side walls of the stacking base;

the rotary shaft and the sheet-pressing driving device are both installed on the first lifting sliding plate; and the first lifting sliding plate is further fixedly provided with a translation slide rail; the translation slider is slidably arranged on the translation slide rail.

In the above structure, the lifting driving device comprises a lifting motor, a driving belt, a first lifting leadscrew, a lifting block and a first lifting sliding rail;

the lifting motor is fixed on an inner wall of the stacking base, both ends of the first lifting leadscrew are rotatably mounted on the inner wall of the stacking base; the first lifting leadscrew fits the lifting block, and the driving belt is sleeved on a first driving wheel of the lifting motor and a first driven wheel at one end of the first lifting leadscrew; the lifting block is fixedly connected with the first lifting sliding plate; the first lifting sliding rail is installed on an outer wall of the stacking base, and the first lifting sliding plate is slidably installed on the first lifting sliding rail;

the sheet-pressing driving device comprises a driving motor and a sheet-pressing, belt; the driving motor is fixed on the first lifting sliding plate, and a second driving wheel is installed on an end of a motor shaft of the driving motor, a second driven wheel is installed on an end of the rotary shaft, and the sheet-pressing belt is sleeved on the second driving wheel and the second driven wheel.

In the above structure, a stacking frame is fixedly installed above the stacking base; the stacking base comprises a top plate and two side plates opposite arranged; the top plate is fixedly installed on tops of the two side plates, and the stacking frame is installed on an upper surface of the top plate;

a clamping jaw is installed on the sheet-pressing plate, one end of the clamping jaw is fixed on a top of the sheet-pressing plate, and an other end of the clamping jaw extends above the stacking frame.

In the above structure, the positive electrode feeding mechanism and the negative electrode feeding mechanism have same structure; wherein the positive electrode feeding mechanism comprises a working platform, a feeding assembly, a tray shifting assembly and a returning assembly;

the feeding assembly comprises a feeding conveyor belt and two first side vertical plates fixed on the working platform in parallel; the feeding conveyor belt is installed on a side of the first side vertical plate, and the feeding conveyor belt is configured to transfer feeding tray above the first side vertical plates;

the returning assembly comprises a returning conveyor belt and two second side vertical plates fixed on the working platform in parallel; the second side vertical plates are located at one side of the first side vertical plate and are parallel to the first side vertical plate; the returning conveyor belt is installed on a side of the second side vertical plate, and the returning conveyor belt is configured to transfer the feeding tray above the second side vertical plates;

the tray shifting assembly comprises two longitudinal conveyor belts arranged in parallel; the longitudinal conveyor belts are perpendicular to the feeding, conveyor belt; each of the first side vertical plate and the second side vertical plate is provided with a notch for accommodating the longitudinal conveyor belt; and the feeding conveyor belt is also provided on the first side vertical plate at a position between the two longitudinal conveyor belts, and the returning conveyor belt is also provided on the second side vertical plate at a position between the two longitudinal conveyor belts.

In the above structure, a first transition wheel is provided under the notch of the first side vertical plate, and a first support wheel is provided on the first side vertical plate at the position between the two longitudinal conveyor belts; the feeding conveyor belt wraps around an underside of the first transition wheel, and then wraps around an upside of the first support wheel;

a second transition wheel is provided under the notch of the second side vertical plate; a second support wheel is provided on the second side vertical plate at the position between the two longitudinal conveyor belts, and the returning conveyor belt wraps around an underside of the second transition wheel and then wraps around an upside of the second support wheel.

In the above structure, the electrode die-cutting mechanism comprises a fixed box body and an electrode feeding assembly, a forming die-cutting assembly, a tab die-cutting assembly, and an electrode conveying assembly arranged on side wall of the fixed box body in sequence;

the electrode feeding assembly is configured to provide raw material to be die-cut to the first die-cutting assembly; the forming die-cutting assembly is configured to die-cut the raw material into electrodes; the tab die-cutting assembly is configured to form tabs on the electrodes.

In the above structure, the tab die-cutting assembly comprises a die-cutting support frame, a first die-cutting assembly, a second die-cutting assembly and a position adjusting assembly;

the first and second die-cutting assemblies are installed side by side on the die-cutting support frame, and the first die-cutting, assembly and the second die-cutting assembly have same structure; wherein the first die-cutting assembly comprises a die-cutting upper seat, a die-cutting lower seat, and a die-cutting driving device configured to drive the die-cutting upper seat to move up and down; the die-cutting driving device is fixed on the die-cutting support frame;

the position adjusting assembly comprises two lower bottom plates, a first adjusting wheel, a translation slide rail, a second adjusting wheel, a first screw and a second screw;

the translation slide rail is fixed on the die-cutting support frame; the die-cutting, lower seat of the first die-cutting assembly and the die-cutting lower seat of the second die-cutting assembly are respectively fixed on two lower bottom plates, and the two lower bottom plates are slidably arranged on the translation slide rail side by side, and lower surfaces of the two lower bottom plates are fixedly provided with nuts; the first adjusting wheel is connected with the first screw; the second adjusting wheel is connected with the second screw; the first screw is arranged under one lower bottom plate, and passes through the nut on the one lower bottom plate; the second screw is provided below an other lower bottom plate and passes through the nut on the other lower bottom plate.

In the above structure, the die-cutting driving device comprises a first die-cutting motor, a motor base, a second lifting sliding plate, a second lifting sliding rail, a second lifting leadscrew and a second lifting leadscrew nut; the first die-cutting motor is fixed on the motor base; the motor base is fixedly connected with the die-cutting support frame; the second lifting sliding rail is installed on a side wall of the motor base in a vertical direction, and the second lifting sliding plate is slidably installed on the second lifting sliding rail; an output shaft of the first die-cutting motor is connected with, the second lifting leadscrew, the second lifting leadscrew nut is arranged on the second lifting leadscrew, and the second lifting leadscrew nut is fixed on a back of the second lifting sliding plate; the second lifting sliding plate is fixedly connected to the die-cutting upper seat;

the die-cutting driving device further comprises a vertical connecting plate; a bottom, of the second lifting sliding plate is provided with a horizontal connecting plate, and a top of the vertical connecting plate is provided with two rollers in a vertical direction; the horizontal connecting plate is clamped between the two rollers, and a bottom of the vertical connecting plate is fixedly connected with the die-cutting upper seat.

The present disclosure achieves following beneficial effects. The integrated equipment of die-cutting and stacking of the present disclosure can complete the work of several previous equipments in one equipment, has a high degree of automation, can greatly improve the working efficiency of the equipment, and reduce labor intensity and labor costs. At the same time, due to the structure of the double stacking table mechanism, during the stacking operation, the first stacking table and the second stacking table can be rotatably switched. Namely, during unloading process of a first cell, the clamping and pressing for first layer of battery separator of a next cell are completed, which greatly saves the unloading time, improves the stacking efficiency of the equipment, and thus improves the production efficiency of the product.

DETAILED DESCRIPTION OF PREFERRED EMBODIMENTS

The present disclosure will be further described below in conjunction with the accompanying drawings and embodiments.

The concept, specific structure and technical effects of the present disclosure will be clearly and completely described below with reference to the embodiments and accompanying drawings. Obviously, the described embodiments are only a part of the embodiments of the present disclosure, rather than all the embodiments. Based on the embodiments of the present disclosure, other embodiments obtained by those skilled in the art without creative efforts are all within the protection scope of the present disclosure. In addition, all the coupling/connection relationships involved in the patent do not mean that the components are directly connected, but refer to a better coupling structure by adding or reducing coupling accessories according to the specific implementation. Various technical features in the present disclosure can be combined interactively on the premise of not contradicting each other.

Figure 1:
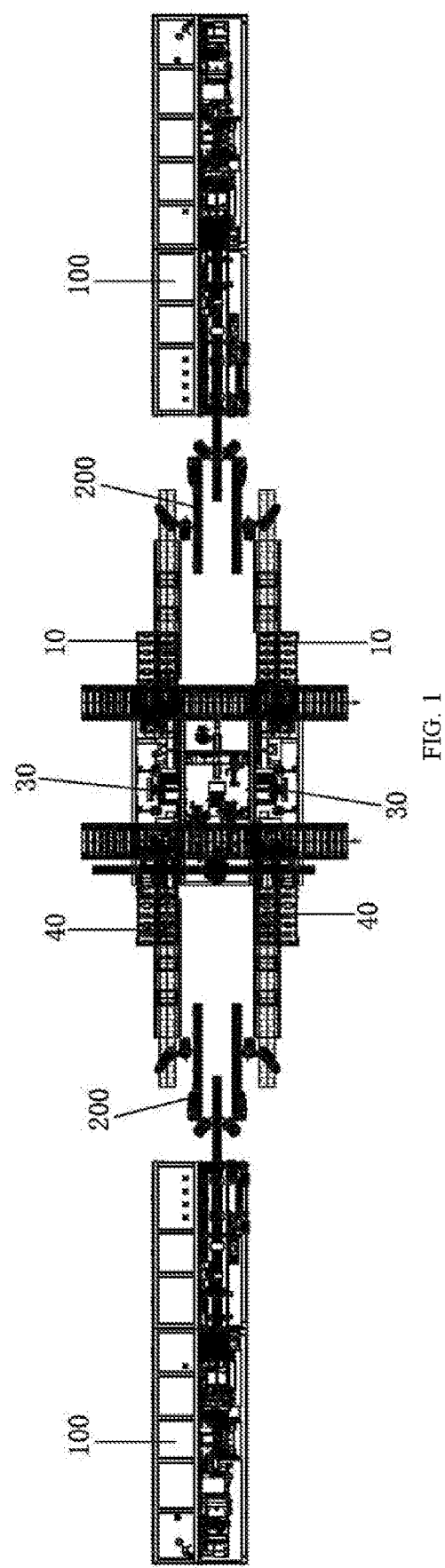
FIG. 1 is a schematic structural diagram of an integrated equipment of die-cutting and stacking according to the present disclosure.
Figure 2:
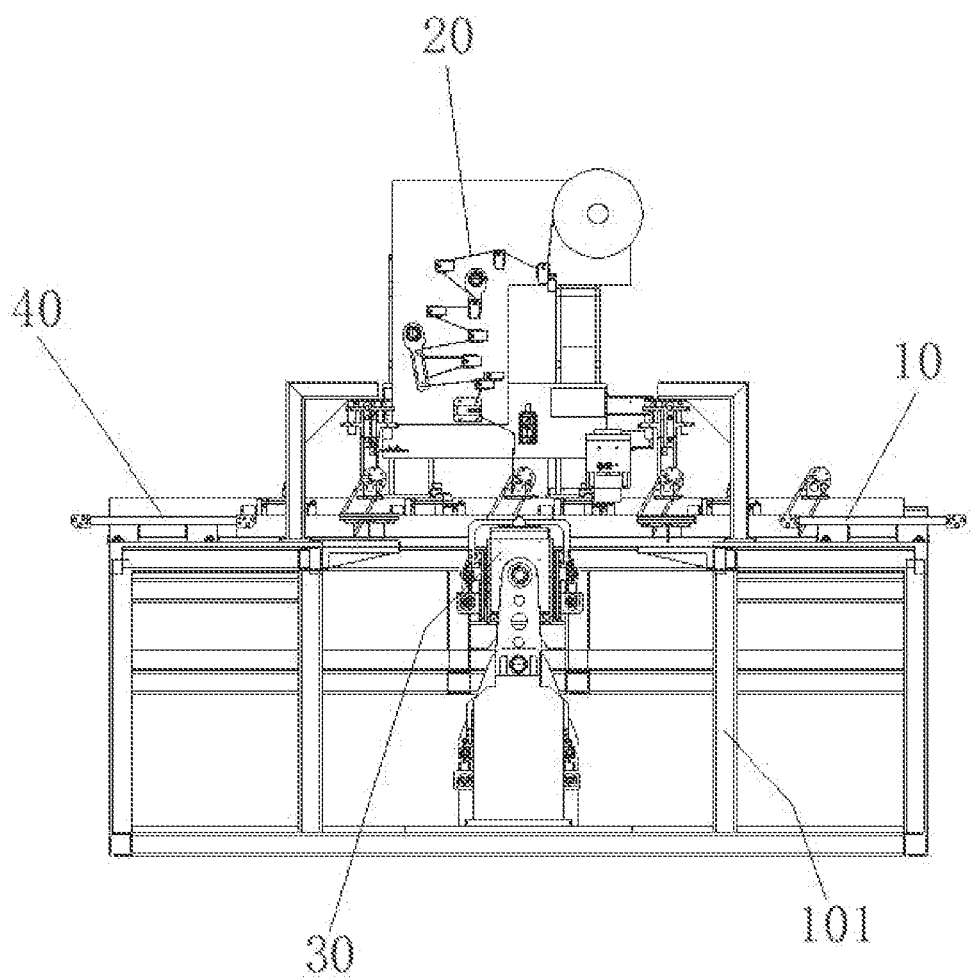
FIG. 2 is a schematic side view of a positive electrode feeding mechanism, a negative electrode feeding mechanism and a double stacking table mechanism of the integrated equipment of die-cutting and stacking of the present disclosure.
Figure 3:
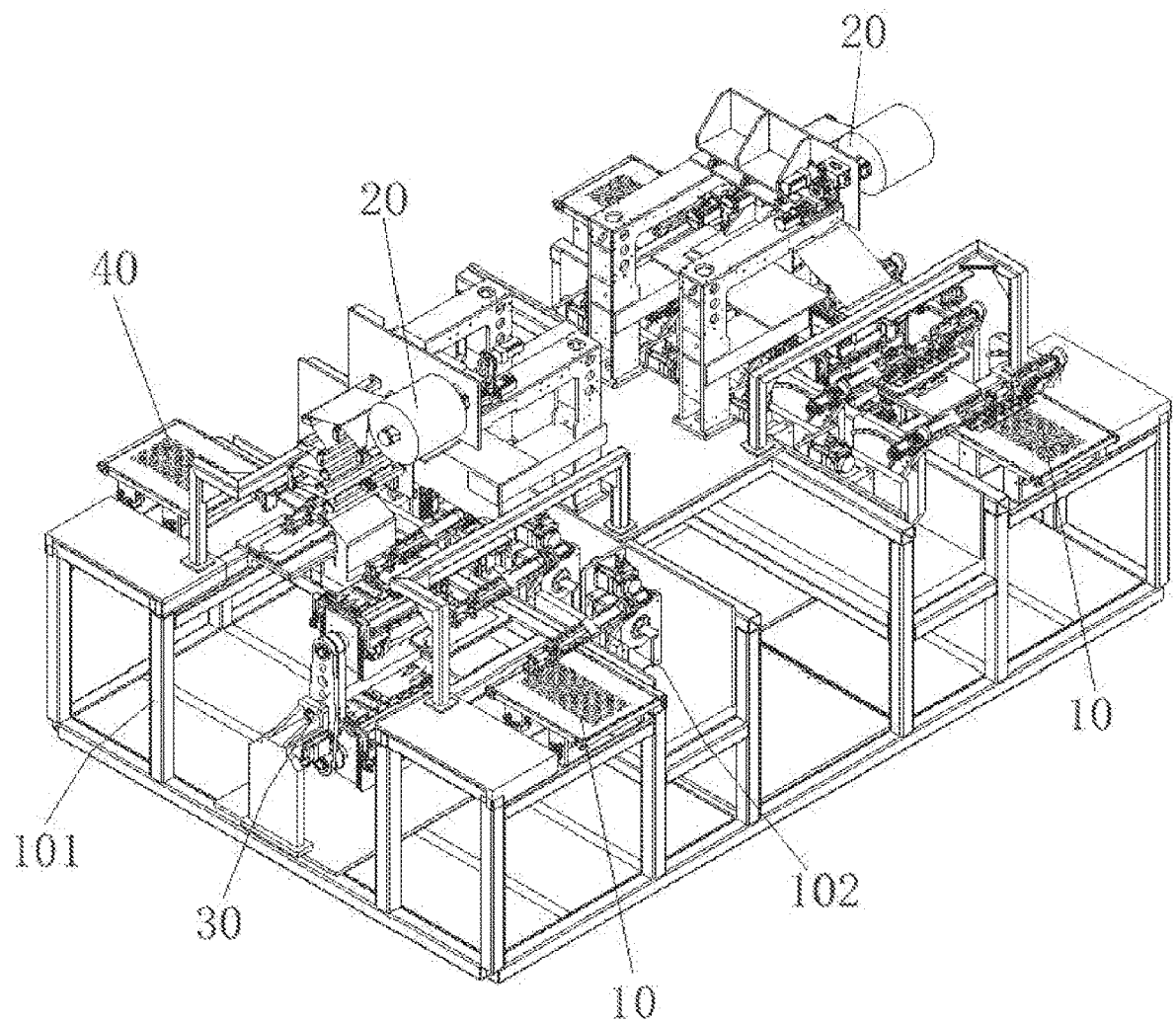
FIG. 3 is a schematic perspective view of the positive electrode feeding mechanism, the negative electrode feeding mechanism and the double stacking table mechanism of the integrated equipment of die-cutting and stacking of the present disclosure.

Referring to FIGS. 1, 2 and 3, the present disclosure provides an integrated equipment of die-cutting and stacking, through which the die-cutting and stacking processes of electrodes are realized to produce cells. The integrated equipment of die-cutting and stacking includes two electrode die-cutting mechanisms 100, two electrode conveying mechanisms 200, a positive electrode feeding mechanism 40, a negative electrode feeding mechanism 10, a battery separator unwinding mechanism 20 and a double stacking table mechanism 30; wherein the positive electrode feeding mechanism 40 and the negative electrode feeding mechanism 10 are respectively arranged on two sides of the double stacking table mechanism 30; and one electrode conveying mechanism 200 is arranged between the electrode die-cutting mechanism 100 and the positive electrode feeding mechanism 40, and another electrode conveying mechanism 200 is arranged between the electrode die-cutting mechanism 100 and the negative electrode feeding mechanism 10. The battery separator unwinding mechanism 20 is located above the double stacking table mechanism 30. The electrode die-cutting mechanisms 100 located on two sides of the integrated equipment are configured to die-cut the electrodes that meet the requirements. The electrodes are transported by the electrode conveying mechanism 200 to the positive electrode feeding mechanism 40 or the negative electrode feeding mechanism 10. The battery separator unwinding mechanism 20 is located above the double stacking table mechanism 30, and is used to feed the double stacking table mechanism 30 with a battery separator to be sandwiched between the positive electrode and the negative electrode. The double stacking table mechanism 30 realizes the stacking operation of the positive electrode and the negative electrode. Therefore, the integrated equipment of die-cutting and stacking of the present disclosure can complete the work of several previous equipments in one equipment, has a high degree of automation, can greatly improve the working efficiency of the equipment, and reduce labor intensity and labor costs.

As shown in FIG. 3, in this embodiment, two double stacking table mechanisms 30 are arranged side by side on the same support frame, and have exactly the same structure. In this embodiment, only one double stacking table mechanism is explained in detail. In addition, it should be noted that a platform support frame 101 is also provided with a plurality of material-transferring robot arms 102, which are configured to transfer the positive electrode and the negative electrode. For example, the positive electrode conveyed by the positive electrode feeding mechanism 40 is transferred to the double stacking table mechanism 30. The structure of the material-transferring robot arm 102 is relatively common in the prior art, and the specific structure thereof will not be explained in this embodiment.

Figure 4:
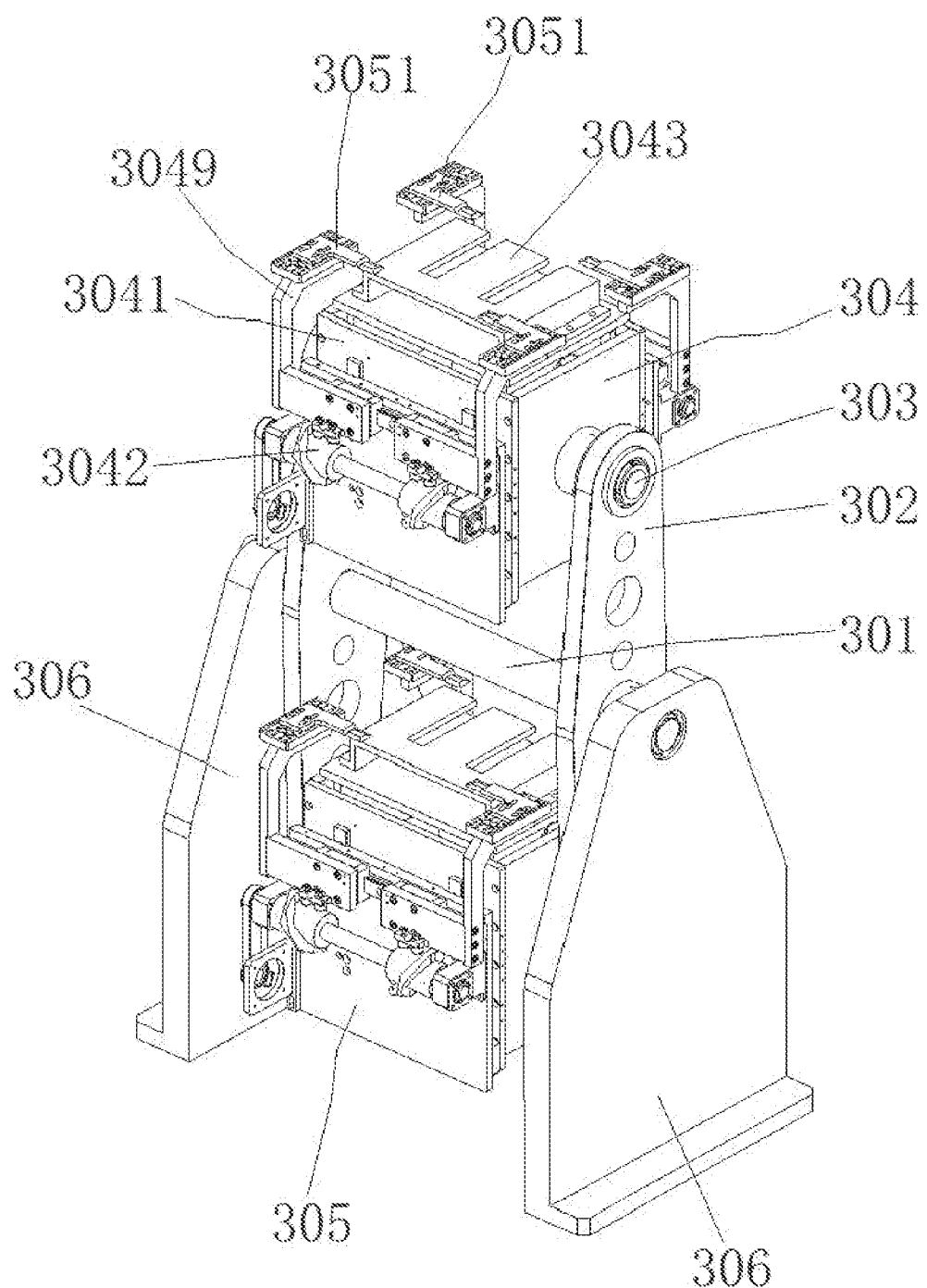
FIG. 4 is a schematic perspective view of the double stacking table mechanism of the integrated equipment of die-cutting and stacking of the present disclosure.
Figure 5:
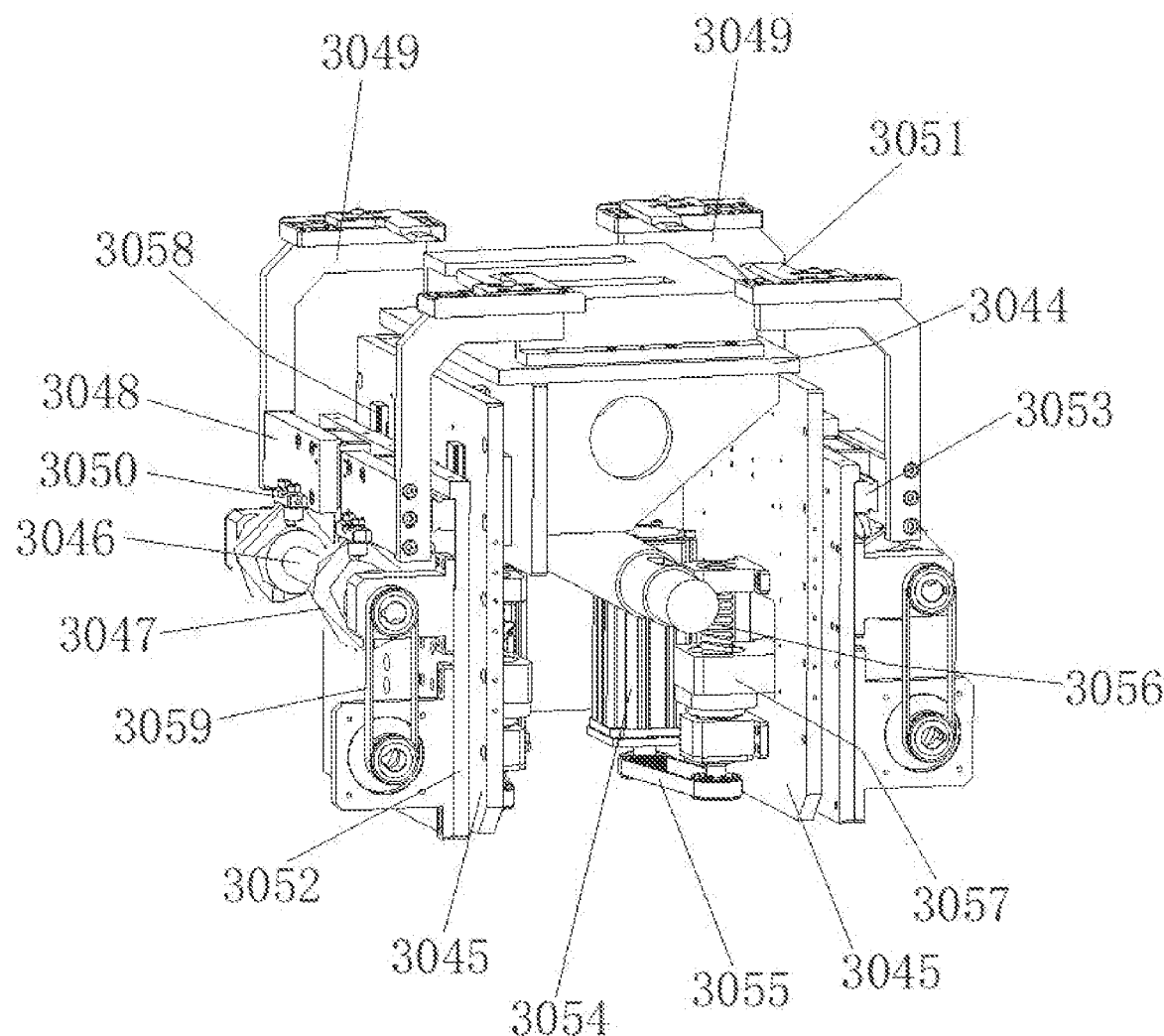
FIG. 5 is a schematic structural diagram of the first stacking table of the double stacking table mechanism of the present disclosure.

As shown in FIG. 4 and FIG. 5, the present disclosure provides a specific embodiment of the double stacking table mechanism 30. The double stacking table mechanism 30 includes a rotating shaft 301, two rotating arms 302, two central rotating shafts 303, a first stacking table 304 and a second stacking table 305. Two ends of the rotating shaft 301 are respectively rotatably mounted on tops of support bases 306, and the two ends of the rotating shaft 301 are respectively fixedly connected to middles of the two rotating arm 302. The first stacking table 304 and the second stacking table 305 are both arranged between the two rotating arms 302, and are located on two sides of the rotating shaft 301 respectively. One central rotating shaft 303 passes through the first stacking table 304; two ends of the one central rotating shaft 303 are respectively rotatably connected with an end of one rotating arm 302 and an end of an other rotating arm 302; an other central rotating shaft 303 passes through the second stacking table 305, two ends of the other central rotating shaft 303 are respectively rotatably connected with an other end of the one rotating arm 302 and an other end of the other rotating arm 302. The first stacking table 304 and the second stacking table 305 are both used to realize the stacking of the electrodes.

Through the above structure, the rotating shaft 301 can be driven to rotate under the driving of power, and the rotating arms 302 can be driven to rotate in the vertical direction. Both the first stacking table 304 and the second stacking table 305 are rotatably connected with the rotating arms 302 by the central rotating shafts 303, so that when the rotating arms 302 rotates, the first stacking table 304 and the second stacking table 305 can alternately reach a highest position. During the stacking operation, the first stacking table 304 and the second stacking table 305 can be rotatably switched. Namely, during unloading process of a first cell, the clamping and pressing for first layer of battery separator of a next cell are completed, which greatly saves the unloading time, improves the stacking efficiency of the equipment, and thus improves the production efficiency of the product.

The present disclosure provides a specific embodiment of the first stacking table 304 and the second stacking table 305. Specifically, the first stacking table 304 and the second stacking table 305 have the same structure. Thus, only the structure of the first, stacking table 304 is described in detail. The first stacking table 304 includes a stacking base 3041 and a sheet-pressing assembly 3042. The central rotating shaft 303 passes through a center of the stacking base 3041, a stacking frame 3043 is fixedly installed above the stacking base 3041. The stacking base 3041 includes a top plate 3044 and two side plates 3045 opposite arranged. The top plate 3044 is fixedly installed on tops of the two side plates 3045, and the stacking frame 3043 is installed on an upper surface of the top plate 3044.

Further, each of opposite side walls of the stacking base 3041 is provided with a sheet-pressing assembly 3042. The sheet-pressing assembly 3042 includes a sheet-pressing driving device, a rotary shaft 3046, a rotary cam 3047, a translation slider 3048 and a sheet-pressing plate 3049. Two rotary cams 3047 are fixedly installed on the rotary shaft 3046. Each rotary cam 3047 has an inclined guide ring, and the guide, rings on the two rotary cams 3047 are symmetrical about a radial center line of the rotary shaft 3046. Each of opposite side walls of the stacking base 3041 is provided with the translation slider 3048. Each translation slider 3048 is fixedly provided with a limit stop 3050; and the guide ring of the rotary cam 3047 is snapped into a limit groove of the limit stop 3050. The sheet-pressing plate 3049 is in a shape of "7", one end of the sheet-pressing plate 3049 is fixedly installed on the translation slider 3048, and the other end of the sheet-pressing plate 3049 extends above the stacking base 3041. Through this structure, when the rotary shaft 3046 rotates, the limit stop drives the translation slider 3048 to translate in, the horizontal direction under the driving action of the rotary cam 3047. The two rotary cams 3047 have the same structure and the guide rings on the rotary cams 3047 are symmetrical about the radial center line of the rotary shaft 3046, so the two translation sliders can move simultaneously in opposite directions, thereby driving the sheet-pressing plates 3049 to open and close. The sheet-pressing driving device is arranged on a side wall of the stacking, base 3041 and is used to drive the rotary shaft 3046 to rotate. A clamping jaw 3051 is installed on the sheet-pressing plate 3049, one end of the clamping jaw 3051 is fixed on a top of the sheet-pressing plate 3049, and the other end of the clamping jaw 3051 extends above the stacking frame 3043.

Further, the first stacking table 304 includes a lifting assembly, and the lifting assembly includes a first lifting sliding plate 3052 and a lifting driving device. The first lifting sliding plate 3052 is arranged on the opposite side walls of the stacking base 3041. The lifting driving device is used to drive the first lifting sliding plate 3052 to slide up and down on the side wall of the stacking base 3041; the rotary shaft 3046 and the sheet-pressing driving device are both installed on the first lifting sliding plate 3052; and the first lifting sliding plate 3052 is also, fixedly provided with a translation slide rail 3053; the translation slider 3048 is slidably installed on the translation slide rail 3053. In this embodiment, as shown in FIG. 2, the lifting driving device includes a lifting motor 3054, a driving belt 3055, a first lifting leadscrew 3056, a lifting block 3057 and a first lifting sliding rail 3058; the lifting motor 3054 is fixed on an inner wall of the stacking base 3041, both ends of the first lifting leadscrew 3056 are rotatably mounted on the inner wall of the stacking base 3041. The first lifting leadscrew 3056 fits the lifting block 3057, and the driving belt 3055 is sleeved on a first driving wheel of the lifting motor 3054 and a first driven wheel at one end of the first lifting leadscrew 3056; the lifting block 3057 is fixedly connected with the first, lifting sliding plate 3052; the first, lifting sliding rail 3058 is installed on an outer wall of the stacking base 3041, and the first lifting sliding plate 3052 is slidably installed on the first lifting sliding rail 3058.

In the above embodiment, the sheet-pressing driving device includes a driving motor (not marked in the figures) and a sheet-pressing belt 3059. The driving motor is fixed on the first lifting sliding plate 3052, and a second driving wheel is installed on an end of a motor shaft of the driving motor, a second driven wheel is installed on an end of the rotary shaft 3046, and the sheet-pressing belt 3059 is sleeved on the second driving wheel and the second driven wheel.

Through the above structure, the lifting assembly is installed inside the stacking base 3041 to realize a hidden structure design, which avoids the lifting assembly from additionally occupying the volume of the first stacking table 304, such that the overall structure is more compact and small. During the stacking process, the lifting assembly can drive the first lifting sliding plate 3052 to reciprocate in the vertical direction. At the same time, the two clamping jaws 3051 apposite arranged, driven by the rotational force of the rotary shaft 3046, can simultaneously open or close. The clamping jaws 3051 can press and release the battery separator according to the control, thereby realizing the stacking operation. The first stacking table 304 has a compact and reasonable structure. After the cell is formed by stacking on the first stacking table 304, the first stacking table 304 is rotated, and the clamping and pressing of the battery separator on the second stacking table 305 are completed while cutting the battery separator and unloading the cell. There is no need to wait for the cell on the first stacking table 304 to be unloaded, thereby shortening the time for cutting the battery separator and unloading the cell in each stacking cycle, and improving the efficiency of stacking. The stacking operation is performed on the first stacking table 304 and the second stacking table 305 one by one, which prevent double layers from placing on the same stacking table, avoid damaging the battery cells, and improve the yield of products.

Figure 6:
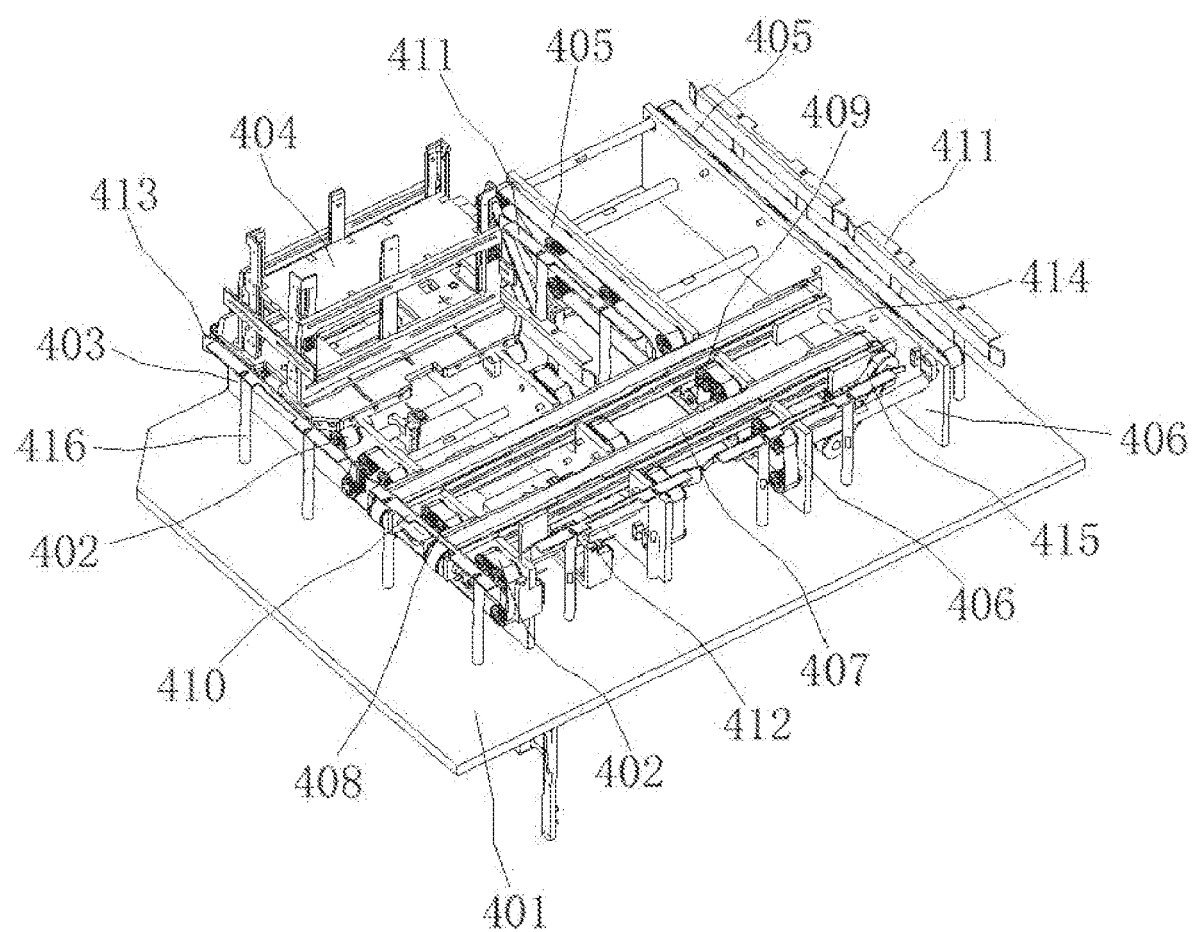
FIG. 6 is a schematic structural diagram of the positive electrode feeding mechanism of the integrated equipment of die-cutting and stacking of the present disclosure.

As shown in FIG. 6, the present disclosure provides a specific embodiment for the positive electrode feeding mechanism 40 and the negative electrode feeding mechanism 10. Since the structures of the positive electrode feeding mechanism 40 and the negative electrode feeding mechanism 10 are completely the same, only the structure of the positive electrode feeding mechanism 40 is described in detail.

The positive electrode feeding mechanism 40 includes a working platform 401, a feeding assembly, a tray shifting assembly and a returning assembly; the feeding assembly includes a feeding conveyor belt 402 and two first side vertical plates 403 fixed on the working platform 401 in parallel. The feeding conveyor belt 402 is installed on a side of the first side vertical plate 403, and the feeding conveyor belt 402 is used to transfer the feeding tray 404 above the first side vertical plate 403. The returning assembly includes a returning conveyor belt 405 and two second side vertical plates 406 fixed on the working platform 401 in parallel. The returning conveyor belt 405 is installed on a side of the second side vertical plate 406, and the returning conveyor belt 405 is used to transfer the feeding tray 404 above the second side vertical plate 406. The tray shifting assembly includes two longitudinal conveyor belts 407 arranged in parallel; the longitudinal conveyor belt 407 is perpendicular to the feeding conveyor belt 402; each of the first side vertical plate 403 and the second side vertical plate 406 is provided with a notch for accommodating the longitudinal conveyor belt 407; and the feeding conveyor belt 402 is also provided on the first side vertical plate 403 at a position between the two longitudinal conveyor belts 407, and the returning conveyor belt 405 is also provided on the second side vertical plate 406 at a position between the two longitudinal conveyor belts 407. In this embodiment, a first transition wheel (not marked in the figures) is provided under the notch of the first side vertical plate 403, and a first support wheel 408 is provided on the first side vertical plate 403 at the position between the two longitudinal conveyor belts 407. The feeding conveyor belt 402 wraps around an underside of the first, transition wheel, and then wraps around an upside of the first support wheel 408. A second transition wheel is provided under an notch of the second side vertical plate 406. A second support wheel 409 is provided on the second side vertical plate 406 at the position between the two longitudinal conveyor belts 407, and the returning conveyor belt 405 wraps around an underside of the second transition wheel and then wraps around an upside of the second support wheel 409.

Through the above structure, the feeding tray 404 is conveyed above the two first side vertical plates 403 through the feeding conveyor belt 402. The feeding conveyor belt 402 is wound on a plurality of pulleys, and rotated by motor. This structure belongs to the existing structure and is not described in this embodiment. When the feeding tray 404 is transferred to an end of the feeding conveyor belt 402, the feeding tray 404 is shifted to the longitudinal conveyor belt 407, such that the electrodes are fed. After the feeding is completed, the empty feeding tray is returned to the returning conveyor belt 405 by the feeding conveyor belt 402. Under the driving of the returning conveyor belt 405, the empty feeding tray is discharged. During this process, since the first side vertical plate 403 between the two longitudinal conveyor belts 407 is also provided with the feeding conveyor belt 402, and the second side vertical plate 406 between the two longitudinal conveyor belts 407 is also provided with the returning conveyor belt 405, the feeding tray will not get stuck when the feeding tray 404 moves from the feeding conveyor belt 402 to the longitudinal conveyor belt 407, and the empty feeding tray moves from the longitudinal conveyor belt 407 to the returning conveyor belt 405, which facilitates the transfer of the feeding tray and improves the transfer efficiency. The electrode feeding mechanism of the disclosure can realize the automatic feeding of the electrode and the automatic recovery of the feeding tray, improve the feeding efficiency, have a high degree of automation and low cost.

In the above structure, the feeding assembly further includes a feeding baffle 410, which is parallel to the first side vertical plates 403 and located outside the two first side vertical plates 403. The returning assembly further includes a returning baffle 411, which is parallel to the second side vertical plates 406 and located outside the two second, side vertical plates 406; the tray shifting assembly further includes a longitudinal baffle 412, which is perpendicular to the feeding baffle 410 and located at an end of the feeding conveyor belt 402. In addition, a front end of the feeding baffle 410 is provided with inclined guide pieces 413. An inlet for the feeding tray 404 is formed between the two guide pieces 413. Through the functions of the feeding baffle 410, the returning baffle 411 and the longitudinal baffle 412, the position of the feeding tray 404 is limited to avoid the position of the feeding tray 404 from shifting. The guide pieces 413 help the feeding tray 404 to move from the inlet to the feeding conveyor belt 402, thereby preventing the feeding tray 404 from being stuck during the conveying process. In addition, the feeding baffle 410, the returning baffle 411 sand the longitudinal baffle 412 are all fixed on a top of a support column 416, and the support column 416 is fixed on the working platform 401.

As a preferred embodiment, as shown in FIG. 6, the tray shifting assembly further includes a longitudinal driving shaft 414, a longitudinal driven shaft (not marked in the figures), a longitudinal driving belt 415 and a power motor (not marked in the figures); the longitudinal conveyor belt 407 is sleeved on the longitudinal driving shaft 414 and the longitudinal driven shaft; one end of the longitudinal driving shaft 414 is provided with a driven pulley, and the power motor is located below the longitudinal conveyor belt 407. A driving pulley is installed on an output shaft of the power motor, and the longitudinal driving belt 415 is sleeved on the driving pulley and the driven pulley.

In the above embodiment, a pinch roller mechanism and a separator cutting mechanism are further provided below the battery separator unwinding mechanism 20. The pinch roller mechanism is used to send the battery separator to a designated position after clamping the battery separator. The separator cutting mechanism is used to cut the battery separator. Since the structures of the pinch roller mechanism and the separator cutting mechanism are relatively common in the prior art, they will not be described in detail in this embodiment.

Figure 7:
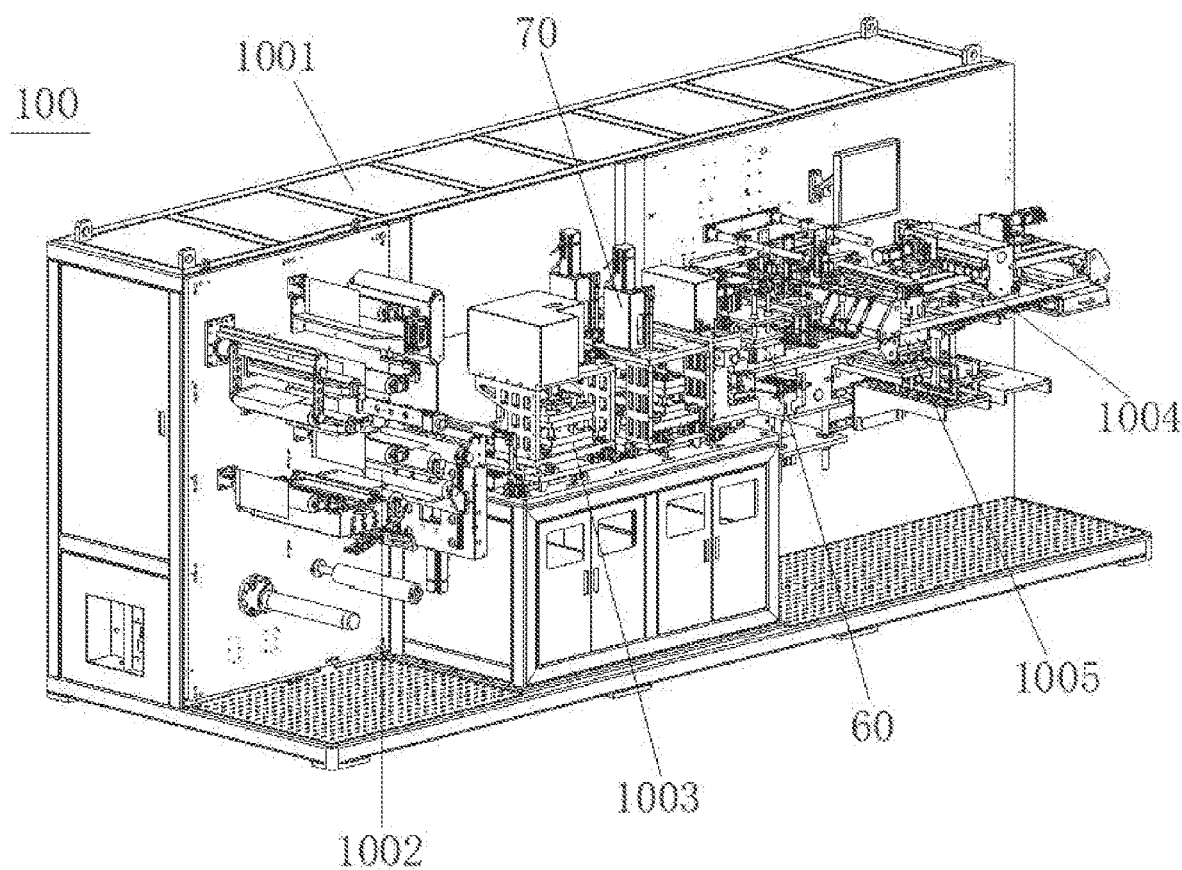
FIG. 7 is a schematic structural diagram of an electrode die-cutting mechanism of the integrated equipment of die-cutting and stacking of the present disclosure.

As shown in FIG. 7, the present disclosure provides a specific embodiment of the electrode die-cutting mechanism 100. The electrode die-cutting mechanism 100 includes a fixed box body 1001 and an electrode feeding assembly 1002, a forming die-cutting assembly 1003, a tab die-cutting assembly 70, and an electrode conveying assembly 1004 arranged on side wall of the fixed box body 1001 in sequence. The electrode feeding assembly 1002 is used to provide raw material to be die-cut to the first die-cutting assembly 702; the forming die-cutting assembly 1003 is used to die-cut the raw material into electrodes; the tab die-cutting assembly 70 is used to form tabs on the electrodes; and the electrode conveying assembly 1004 is used to convey the electrodes die-cut and then the electrodes die-cut are transported through the electrode conveying mechanism 200. Generally, the electrode conveying mechanism 200 adopts conveyor belts and mechanical arms, which will not be described in detail, in this embodiment.

Figure 8:
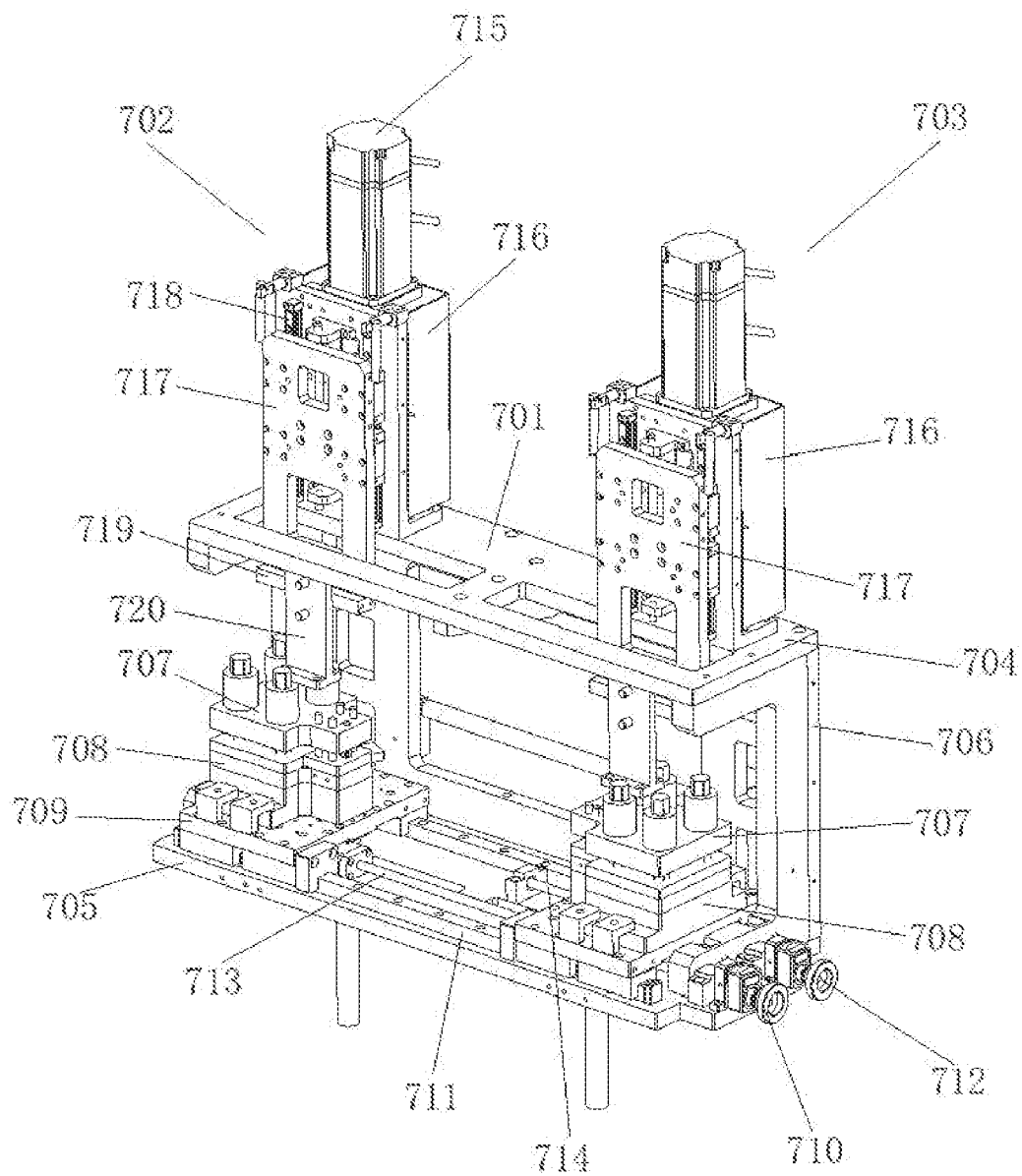
FIG. 8 is a schematic structural diagram of a tab die-cutting mechanism of the electrode die-cutting mechanism of the present disclosure.

As shown in FIG. 8, the present disclosure provides a specific embodiment of the tab die-cutting assembly 70, through which the tabs on the electrode can be cut. The tab die-cutting assembly 70 includes a die-cutting support frame 701, a first die-cutting assembly 702, a second die-cutting assembly 703 and a position adjusting assembly; the first and second die-cutting assemblies 702 and 703 are installed side by side on the die-cutting support frame 701. In this embodiment, the die-cutting support frame includes a first horizontal plate 704, a second horizontal plate 705 and a vertical support plate 706; the first horizontal plate 704 is fixed on a top of the vertical support plate 706. The second horizontal plate 705 is fixed on a bottom end of the vertical support plate 706. The first horizontal plate 704 and the second horizontal plate 705 are located on the same side of the vertical support plate 706. The first die-cutting assembly 702 and the second die-cutting assemblies 703 are fixed side by side on the first horizontal plate 704. In this embodiment, the structures of the first die-cutting assemblies 702 and the second die-cutting assemblies 703 are the same, so only the first die-cutting assembly 702 is described in this embodiment. The first die-cutting assembly 702 includes a die-cutting upper seat 707, a die-cutting lower seat 708, and a die-cutting driving device that drives the die-cutting upper seat 707 to move up and down. The die-cutting driving device is fixed on the first horizontal plate 704.

Further, in the above embodiment, the position adjusting assembly includes a lower bottom plate 709, a first adjusting wheel 710, a translation slide rail 711, a second adjusting wheel 712, a first screw 713 and a second screw 714. The translation slide rail 711 is fixed on an upper surface of the second horizontal plate 705; the die-cutting lower seat 708 of the first die-cutting assembly 702 and the die-cutting lower seat 708 of the second die-cutting assembly 703 are respectively fixed on one lower bottom plate 709, and the two lower bottom plates 709 are slidably arranged on the translation slide rail 711 side by side, and the lower surfaces of the two lower bottom plates 709 are fixedly provided with nuts (not marked in the figure). The first adjusting wheel 710 is connected with the first screw 713. The second adjusting wheel 712 is connected with the second screw 714. The first screw 713 is arranged under one lower bottom plate 709, and passes through the nut on the one lower bottom plate 709; the second screw 714 is provided below the other lower bottom plate 709 and passes through the nut on the other lower bottom plate 709.

Through the above structure, when the first, adjusting wheel 710 is rotated, the first screw 713 is driven to rotate, and through the cooperation of the first screw 713 and the nut, one of the two lower bottom plates 709 is driven to slide on the translation slide rail 711. Similarly, when the second adjusting wheel 712 is rotated, another lower bottom plate 709 is driven to slide on the translation slide rail 711. The distance between the two die-cutting lower seats 708 of the first die-cutting assembly 702 and the second die-cutting assembly 703 is adjusted by rotating the first adjusting wheel 710 and the second adjusting wheel 712 in different directions, thereby realizing the die-cutting, of the electrodes between the two die-cutting upper seats and the two die-cutting lower seats. Therefore, the integrated equipment can die-cut electrodes with different sizes, so as to improves the applicability and general performance of the die-cutting equipment, reduces the cost of the die-cutting equipment, and a multi-purpose machine is realized.

As a preferred embodiment, as shown in FIG. 8, the present disclosure provides a specific embodiment of the die-cutting driving device. The die-cutting driving device includes a first die-cutting motor 715, a motor base 716, a second lifting sliding plate 717, a second lifting sliding rail 718, a second lifting leadscrew (not marked in the figures) and second lifting leadscrew nut (not marked in the figures); the first die-cutting motor 715 is fixed on the motor base 716, the motor base 716 is fixedly connected with the die-cutting support frame 701; the second lifting sliding rail 718 is installed on a side wall of the motor base 716 in a vertical direction, and the second lifting sliding plate 717 is slidably installed on the second lifting sliding rail 718. The output shaft of the first die-cutting motor 715 is connected with the second lifting leadscrew, the second lifting leadscrew nut is arranged on the second lifting leadscrew, and the second lifting leadscrew nut is fixed on a back of the second lifting sliding plate 717, which is fixedly connected to the die-cutting upper seat 707. Thus, through the rotation of the first die-cutting motor 715, the second lifting sliding plate 717 can be driven to rise and fall, so as to drive the die-cutting upper seat 707 to rise and fall. The electrodes are die-cut through the relative movement of die-cutting upper seat 707 and die-cutting lower seat 708.

In this embodiment, the die-cutting driving device further includes a vertical connecting plate 719; a bottom of the second sliding plate 717 is provided with a horizontal connecting plate 720, and a top of the vertical connecting plate 719 is provided with two rollers in a vertical direction; the horizontal connecting plate 720 is clamped between the two rollers, and the bottom of the vertical connecting plate 719 is fixedly connected with the die-cutting upper seat 707. In this way, when the position of one of the lower bottom plates 709 or two of the lower bottom plates 709 is adjusted, a horizontal displacement can be generated between the vertical connecting plate 719 and the second lifting sliding plate 717, which does not affect that the die-cutting upper seat 707 is driven by the second lifting sliding plate 717 to rise and fall. The die-cutting driving device has an ingenious structure, which facilitates the adjustment of the positions of the die-cutting upper seat 707 and the die-cutting lower seat 708. In addition, a bearing, seat is fixedly installed on an upper surface of the second horizontal plate 705, and a top end of the first screw rod 713 and a top end of the second screw rod 714 are installed in the corresponding bearing seats.

Figure 9:
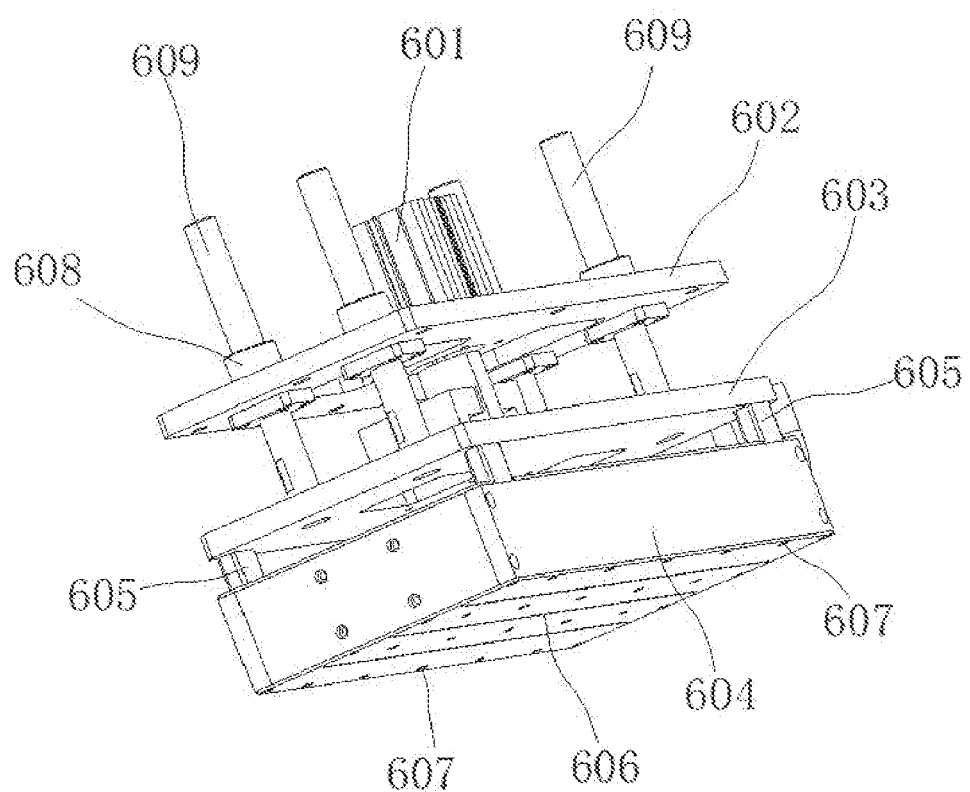
FIG. 9 is a schematic structural diagram of a dust removal structure of the electrode die-cutting mechanism of the present disclosure.

In addition, an upper dust removal assembly 60 and a lower dust removal assembly 1005 are further provided in front of the electrode feeding assembly 1004. As shown in FIG. 9, the structures of the upper dust removal assembly 60 and the lower dust removal assembly 1005 are exactly the same. In this embodiment, only the upper dust removal assembly is described in detail. The upper dust removal assembly includes a dust removal motor 601, a motor fixing plate 602, a guide block fixing plate 603 and a dust removal block 604; the dust removal motor 601 is fixedly installed on the motor fixing plate 602, and the guide block fixing plate 603 is arranged on between the motor fixing plate 602 and the dust removal block 604; a motor shaft of the dust removal motor 601 passes through the guide block fixing plate 603 and is connected with the dust removal block 604. In this embodiment, the dust removal motor 601 is a telescopic motor, which can drive the dust removal block 604 move up and down. When the electrode needs to be adsorbed, the dust removal motor 601 drives the dust removal block 604 to protrude. When the dust removal is completed, the dust removal block 604 releases the electrode, and the dust removal motor 601 drives the dust removal block 604 to retract, so as to facilitate the dust removal of the next electrode. Further, a plurality of bar-shaped guide blocks 605 are fixedly arranged on a side of the guide block fixing plate 603 facing the dust removal block 604; the dust removal block 604 is provided with a plurality of guide holes, and an end of a bar-shaped guide block 605 is inserted into the guide hole of the dust removal block 604; a side of the dust removal block 604 facing away from the guide block fixing plate 603 is provided with a plurality of strip-shaped exhaust ports 606. and the plurality of strip-shaped exhaust ports 606 are parallel. A plurality of vacuum suction holes 607 are provided between adjacent strip-shaped exhaust ports 606.

In this embodiment, the dust removal block 604 is provided with three strip-shaped exhaust ports 606 side by side. The strip-shaped exhaust ports 606 are used for blowing air outward. The vacuum suction holes 607 between the adjacent strip-shaped exhaust ports 606 are all arranged in a straight line. When the electrode needs to be dedusted, the dust removal block 604 is pressed on the electrode, and the electrode is sucked by the vacuum suction hole 607 to prevent the electrode from falling. At the same time, the strip exhaust port 606 blows air outward to realize the dust removal of electrodes.

In the present disclosure, since a plurality of strip-shaped exhaust ports 606 are arranged side by side on the dust removal block 604, dust can be removed from all parts of the electrode; and at the same time, the plurality of vacuum suction holes 607 can suck the electrode to prevent the electrodes from falling off during the dust removal process. Compared with the technical solution of dust removal by brushes in the prior art, the technical solution of the present disclosure has better dust removal effect and improves dust removal efficiency. The dust removal of two electrodes can be realized by two upper dust removal assemblies with the same structure.

In addition, in the above embodiment, a plurality of guide sleeves 608 are fixedly installed on the motor fixing plate 602, and a guide rod 609 is provided in each guide sleeve 608, and a bottom end of the guide rod 609 abuts against the guide block fixing plate 603. When the dust removal motor 601 drives the dust removal block 604 to retract, the bar-shaped guide block 605 can guide the movement of the dust removal block 604 to prevent the position of the dust removal block 604 from shifting.

The above is a specific description of the preferred embodiments of the present disclosure, but the present disclosure is not limited, to the described embodiments, and those skilled in the art can also make various equivalent deformations or replacements on the premise that does not violate the spirit of the present disclosure, these equivalent modifications or substitutions are all included within the scope defined by the claims of the present application.

What is claimed is:

1. An integrated equipment of die-cutting and stacking, comprising
   two electrode die-cutting mechanisms,
   two electrode conveying mechanisms,
   a positive electrode feeding mechanism,
   a negative electrode feeding mechanism,
   a battery separator unwinding mechanism; and
   a double stacking table mechanism; wherein
   the positive electrode feeding mechanism and the negative electrode feeding mechanism are respectively arranged on two sides of the double stacking table mechanism; and one electrode conveying mechanism is arranged between the electrode die-cutting mechanism and the positive electrode feeding mechanism, and another electrode conveying mechanism is arranged between the electrode die-cutting mechanism and the negative electrode feeding mechanism; the battery separator unwinding mechanism is located above the double stacking table mechanism;
   the double stacking table mechanism comprises a rotating shaft, two rotating arms, two central rotating shafts, a first stacking table and a second stacking table; two ends of the rotating shaft are respectively fixedly connected to middles of the two rotating arms; the first stacking table and the second stacking table are both arranged between the two rotating arms, and are located on two sides of the rotating shaft respectively; one central rotating shaft passes through the first stacking table, two ends of the one central rotating shaft are respectively rotatably connected with an end of one rotating arm and an end of an other rotating arm; another central rotating shaft passes through the second stacking table, two ends of the other central rotating shaft are respectively rotatably connected with an other end of the one rotating arm and an other end of the other rotating arm; the first stacking, table and the second stacking table are both configured to realize stacking of electrodes.

2. The integrated equipment of die-cutting and stacking of claim 1, wherein the first stacking table and the second stacking table have same structure; wherein, the first stacking table comprises a stacking base and a sheet-pressing assembly; the central rotating shaft passes through a center of the stacking base; each of opposite side walls of the stacking base is provided with a sheet-pressing assembly; the sheet-pressing assembly includes a sheet-pressing driving device, a rotary shaft, two rotary cams, two translation sliders and a sheet-pressing plate;
   the two rotary cams are fixedly installed on the rotary shaft; each rotary cam is provided with an inclined guide ring, and the inclined guide rings on the two rotary cams are symmetrical about a radial center line of the rotary shaft; each of the opposite side walls of the stacking base is slidably provided with the translation slider; each translation slider is fixedly provided with a limit stop; and the guide ring of the rotary cam is snapped into a limit groove of the limit stop;
   the sheet-pressing plate is in a shape of "7", one end of the sheet-pressing plate is fixedly installed on the translation slider, and an other end of the sheet-pressing plate extends above the stacking base; the sheet-pressing driving device is arranged on a side wall of the stacking base and is configured to drive the rotary shaft to rotate.

3. The integrated equipment of die-cutting and stacking of claim 2, wherein the first stacking table further comprises a lifting, assembly, and the lifting assembly comprises two first lifting sliding plates and a lifting driving device; the two first lifting sliding plates are respectively arranged on the opposite side walls of the stacking base; the lifting driving device is configured to drive the two first lifting sliding plates to slide up and down on the opposite side walls of the stacking base;

the rotary shaft and the sheet-pressing driving device are both installed on the first lifting sliding plate; and the first lifting sliding plate is further fixedly provided with a translation slide rail; the translation slider is slidably arranged on the translation slide, rail.

4. The integrated equipment of die-cutting and stacking of claim 3, wherein the lifting driving device comprises a lifting motor, a driving belt, a first lifting leadscrew, a lifting block and a first lifting sliding rail;

the lifting motor is fixed on an inner wall of the stacking base, both ends of the first lifting leadscrew are rotatably mounted on the inner wall of the stacking base; the first lifting leadscrew fits the lifting block, and the driving belt is sleeved on a first driving wheel of the lifting motor and a first driven wheel at one end of the first lifting leadscrew; the lifting block is fixedly connected with the first lifting sliding plate; the first lifting sliding rail is installed on an outer wall of the stacking base, and the first lifting sliding plate is slidably installed on the first lifting sliding rail;

the sheet-pressing driving device comprises a driving motor and a sheet-pressing belt; the driving motor is fixed on the first lifting sliding plate, and a second driving wheel is installed on an end of a motor shaft of the driving motor, a second driven wheel is installed on an end of the rotary shaft, and the sheet-pressing belt is sleeved on the second driving wheel and the second driven wheel.

5. The integrated equipment of die-cutting and stacking of claim 2, wherein a stacking frame is fixedly installed above the stacking base; the stacking base comprises a top plate and two side plates opposite arranged; the top plate is fixedly installed on tops of the two side plates, sand the stacking frame is installed on an upper surface of the top plate;

a clamping jaw is installed on the sheet-pressing plate, one end of the clamping jaw is fixed on a top of the sheet-pressing plate, and an other end of the clamping jaw extends above the stacking frame.

6. The integrated equipment of die-cutting and stacking of claim 1, wherein the positive electrode feeding mechanism and the negative electrode feeding mechanism have same structure; wherein the positive electrode feeding mechanism comprises a working platform, a feeding assembly, a tray shifting assembly and a returning assembly:

the feeding assembly comprises a feeding conveyor belt and two first side vertical plates fixed on the working platform in parallel; the feeding conveyor belt is installed on a side of the first side vertical plate, and the feeding conveyor belt is configured to transfer feeding tray above the first side vertical plates;

the returning assembly comprises a returning conveyor belt and two second side vertical plates fixed on the working platform in parallel; the second side vertical plates are located at one side of the first side vertical plate and are parallel to the first side vertical plate; the returning conveyor belt is installed on a side of the second side vertical plate, and the returning conveyor belt is configured to transfer the feeding tray above the second side vertical plates;

the tray shifting assembly comprises two longitudinal conveyor belts arranged in parallel; the longitudinal conveyor belts are perpendicular to the feeding conveyor belt; each of the first side vertical plate and the second side vertical plate is provided with a notch for accommodating the longitudinal conveyor belt; and the feeding conveyor belt is also provided on the first side vertical plate at a position between the two longitudinal conveyor belts, and the returning conveyor belt is also provided on the second side vertical plate at a position between the two longitudinal conveyor belts.

7. The integrated equipment of die-cutting and stacking of claim 6, wherein a first transition wheel is provided under the notch of the first side vertical plate, and a first support wheel is provided on the first side vertical plate at the position between the two longitudinal conveyor belts; the feeding conveyor belt wraps around an underside of the first transition wheel, and then wraps around an upside of the first support wheel;

a second transition wheel is provided under the notch of the second side, vertical plate; a second support wheel is provided on the second side vertical plate at the position between the two longitudinal conveyor belts, and the returning conveyor belt wraps around an underside of the second transition wheel and then wraps around an upside of the second support wheel.

8. The integrated equipment of die-cutting and stacking of claim 1, wherein the electrode die-cutting mechanism comprises a fixed box body and an electrode feeding assembly, a forming die-cutting assembly, a tab die-cutting assembly, and an electrode conveying assembly arranged on side wall of the fixed box body in sequence;

the electrode feeding assembly is configured to provide raw material to be die-cut to a first die-cutting assembly; the forming die-cutting assembly is configured to die-cut the raw material into electrodes; the tab die-cutting assembly is configured to form tabs on the electrodes.

9. The integrated equipment of die-cutting and stacking of claim 8, wherein the tab die-cutting assembly comprises a die-cutting support frame, the first die-cutting assembly, a second die-cutting assembly and a position adjusting assembly;

the first and second die-cutting assemblies are installed side by side on the die-cutting support frame, and the first die-cutting assembly and the second die-cutting assembly have same structure; wherein the first die-cutting, assembly comprises a die-cutting upper seat, a die-cutting lower seat, and a die-cutting driving device configured to drive the die-cutting upper seat to move, up and down; the die-cutting driving device is fixed on the die-cutting support frame;

the position adjusting assembly comprises two lower bottom plates, a first adjusting wheel, a translation slide rail, a second adjusting wheel, a first screw and a second screw;

the translation slide rail is fixed on the die-cutting support frame; the die-cutting lower seat of the first die-cutting assembly and the die-cutting lower seat of the second die-cutting assembly are respectively fixed on two lower bottom plates, and the two lower bottom plates are slidably arranged on the translation slide rail side by side, and lower surfaces of the two lower bottom plates are fixedly provided with nuts; the first adjusting wheel is connected with the first screw; the second adjusting wheel is connected with the second screw; the first screw is arranged under one lower bottom plate, and passes through the nut on the one lower bottom plate; the second screw is provided below an other lower bottom plate and passes through the nut on the other lower bottom plate.

10. The integrated equipment of die-cutting and stacking of claim 9, wherein the die-cutting driving device comprises a first die-cutting motor, a motor base, a second lifting sliding plate, a second lifting sliding rail, a second lifting leadscrew and a second lifting leadscrew nut; the first die-cutting motor is fixed on the motor base; the motor base is, fixedly connected with the die-cutting support frame; the second lifting sliding rail is installed on a side wall of the motor base in a vertical direction, and the second lifting sliding plate is slidably installed on the second lifting sliding rail; an output shaft of the first die-cutting motor is connected with the second lifting leadscrew, the second lifting leadscrew nut is arranged on the second lifting leadscrew, and the second lifting leadscrew nut is fixed on a back of the second lifting sliding plate; the second lifting sliding plate is fixedly connected to the die-cutting upper seat;

the die-cutting driving device further comprises a vertical connecting plate; a bottom of the second lifting sliding plate is provided with a horizontal connecting plate, and a top of the vertical connecting plate is provided with two rollers in a vertical direction; the horizontal connecting plate is clamped between the two rollers, and a bottom of the vertical connecting plate is fixedly connected with the die-cutting upper seat.

\* \* \* \* \*